(12) United States Patent
Kurosaka et al.

(10) Patent No.: US 6,363,791 B1
(45) Date of Patent: Apr. 2, 2002

(54) PRESSURE SENSOR

(75) Inventors: Akihito Kurosaka; Osamu Nakao; Takanao Suzuki; Masahiro Sato; Hitoshi Nishimura, all of Tokyo (JP)

(73) Assignee: Fujitsu Ltd. (JP)

( * ) Notice: Subject to any disclaimer, the term of this patent is extended or adjusted under 35 U.S.C. 154(b) by 0 days.

(21) Appl. No.: 09/356,666

(22) Filed: Jul. 19, 1999

(51) Int. Cl.[7] .................................................. G01L 9/12
(52) U.S. Cl. ............................................ 73/724; 73/718
(58) Field of Search ....................... 73/718, 724, 715, 73/756; 361/283.4, 297

(56) References Cited

U.S. PATENT DOCUMENTS 5,367,429 A * 11/1994 Tsuchitani et al. .......... 361/280
5,528,452 A    6/1996 Ko ........................... 361/283.4
5,656,781 A * 8/1997 Kankkunen .................. 73/724

* cited by examiner

*Primary Examiner*—Benjamin R. Fuller
*Assistant Examiner*—Abdullahi Awamusse
(74) *Attorney, Agent, or Firm*—Chadbourne & Parke

(57) ABSTRACT

A capacitance pressure sensor that prevents leakage from outside the sensor to the reference pressure cavity, has a structure that can decrease defects due to leakage compared to conventional technology. An electrode comprising a thin metallic layer is formed on the upper surface of a glass substrate that forms one of the substrates of a pressure sensor and an external electrode is formed on the surface edge of the substrate. In addition, in the region where the silicon substrate is bonded, a feedthrough extending from the electrode to the external electrode is formed, and spine shaped layers with three braches for blocking leakage gas are formed perpendicularly to the feedthrough.

25 Claims, 5 Drawing Sheets

Related Art

Prior Art

Prior Art

Prior Art

PRESSURE SENSOR

BACKGROUND OF THE INVENTION

1. Field of the Invention

The present invention relates to a semiconductor absolute pressure sensor that detects the pressure change to be measured by the change in capacitance, and in particular to improving the electrode structure thereon, and increasing the leakage resistance of the reference pressure cavity that is indispensable to the absolute pressure sensor.

2. Description of Related Art

In a semiconductor pressure sensor that measures absolute pressure, the sealing characteristic of the reference pressure cavity 5 formed between a silicon substrate 3 having a diaphragm 1 and a silicon wall 2 and another substrate 4 bonded at the region of the silicon wall 2 of this silicon substrate 3, as shown for example in FIG. 4, is important. The reason is that in the case of a semiconductor pressure sensor, the deflection of this diaphragm depends on the pressure difference produced between the externally applied pressure and the inside of the reference pressure cavity. Therefore, when a leakage from the outside into the reference pressure cavity occurs, because the pressure in the reference pressure cavity gradually changes or fluctuates, even when the pressure applied from the outside is constant, the pressure value output by the sensor varies with time. In addition, this fluctuation depends on the rate of the leakage.

As shown in FIG. 4, a resistor 6 is formed in the diaphragm 1, and in the case of a semiconductor pressure sensor (referred to hereinbelow as a "piezoresistant pressure sensor") that detects the pressure of a measured medium based on the change in the resistance of the resistor 6, generally a hermetically sealed reference pressure cavity 5 is easily obtainable, and the leakage rate is small. The reason is that the detection circuit 7 for detecting the variation of this resistance can be formed on the surface of a silicon substrate 3, and can be formed completely independently of the reference pressure cavity 5. That is, normally, in a piezoresistant pressure sensor, the reference pressure cavity is sealed with a high degree of airtightness by the application of a widely used technology such as electrostatic bonding because there is no part where an electrode is brought out to the outside, etc., from within the reference pressure cavity.

In contrast, in the case of capacitance pressure sensor, because the pressure of the measured medium is detected based on the fluctuation in the capacitance between the diaphragm that deflects according to the pressure and the opposite substrate, as shown in the representative structure of FIG. 5, it is necessary to provide electrodes 8, 9 respectively on the diaphragm 1 side and the facing substrate 4 side. In addition, normally, one of the electrodes 8, 9 has a structure covered by an insulating layer 10 (the electrode 9 on the substrate side in FIG. 5).

Generally, in a semiconductor pressure sensor, the diaphragm is has as a starting material a silicon substrate. Therefore, on the diaphragm side, several technologies are used that form an electrode for capacitance detection by providing a high conductivity by doping in high concentration boron or phosphorus in the silicon substrate. In addition, when doping technology is used, a lead that connects the electrode in the reference pressure cavity and the external electrode can be easily obtained.

In addition, in FIG. 5, on substrate 4 opposite the diaphragm, glass substrates are widely used. The reason is that a glass substrate can be hermetically sealed to the silicon substrate at low cost by electrostatic bonding. However, on this glass substrate, because it is not possible to apply this doping technology, on the electrode 9 on the glass substrate 4 side, conventionally thin metallic layer has come to be used.

Here, in order to detect fluctuation in the capacitance, it is necessary to extend an electrode 9 on the glass substrate 4 side positioned within the reference pressure cavity 5 to an external electrode. (Hereinbelow, this lead is referred to as a feedthrough.)

The formation cost of the feedthrough is least expensive if it is formed at the same time as the electrode 9. Therefore, the thin metallic layer of the feedthrough comprises the same material as the electrode 9, and usually has the same thickness. In addition, the pattern width of the feedthrough should be as narrow as possible in order to decrease the parasitic capacity of the pressure sensor as a whole. However, in contrast, in order to make the electrical resistance small, the pattern width should be as wide as possible. Thus, the balance between both the parasitic capacity and the electrical resistance determines the width of the feedthrough.

The structure formed by this feedthrough and the external electrode is shown in FIG. 6 to FIG. 8. FIG. 6 is a vertical cross-section of the entire semiconductor pressure sensor, FIG. 7 is a planar drawing showing the electrode on the glass substrate side, and FIG. 8 is a planar drawing showing the electrode on the silicon substrate side. In these figures, reference numeral 9 is the electrode on the glass substrate side, 11 is the external electrode on the glass substrate side, 12 is the feedthrough that connects the electrode 9 on the glass substrate side and the external electrode 11, 8 is an electrode on the silicon substrate side, 13 is an external electrode on the silicon substrate side, and 14 is a lead that connects the electrode 8 on the silicon substrate side and the external electrode 13.

In the structure shown in FIG. 6 to FIG. 8, when the silicon substrate 3 and the glass substrate 4 undergo electrostatic bonding, as shown in FIG. 9, a difference in level is produced on the insulating layer 10 reflecting the difference in level produced by the feedthrough 12, and as a result, gaps 15 are made between the difference in level of the insulating layer 10 and the silicon substrate 3. This gap 15 becomes a leakage path between the outside of the sensor and the reference pressure cavity 5.

Here, as a means of excluding this leakage path, U.S. Pat. No. 5,528,452 by Wen K. Ko, proposes limiting the thickness of the metallic layer of the feedthrough to 0.1~0.3 $\mu$m. It is disclosed that by making the feedthrough have this thickness, leakage to the reference pressure cavity is not produced.

However, when manufacturing a sensor having the extremely low leakage rate equal to or below $1 \times 10^{-13}$ atm·cc/sec, even if the thickness of the metallic layer of the feedthrough is made 0.1 $\mu$m, in the structure of the conventional sensor shown in FIG. 6 to FIG. 8, there is the major problem that the rate of defects due to this leakage exceeds 50%.

This phenomenon is caused by various changes in the size of the leakage path shown in FIG. 9 due to variations in the surface roughness of the glass substrate, or variations in the thickness of the metallic layer of the feedthrough, or further, variations in the thickness of the insulating layer, etc., and when this path exceeds a certain size, the leakage rate to the reference pressure cavity exceeds $1 \times 10^{-13}$ atm·cc/sec.

SUMMARY OF THE INVENTION

In consideration of the above-described problem, the present invention has as an object providing a pressure sensor that prevents leakage to the reference pressure cavity from outside the sensor in a capacitor pressure sensor, and that has a structure which can decrease defects due to leakage in comparison with conventional technology.

In order to attain the above object, in a pressure sensor of the present invention that bonds the upper surface of a first substrate a second substrate having a diaphragm and a thick part at this thick part, provides a first electrode covered by insulating layer positioned opposite to the diaphragm of the second substrate on the surface of the first substrate, and at the same time provides a second electrode on the diaphragm of the second substrate, and detects the pressure fluctuation to be measured by the change or fluctuation of the capacitance formed by the first electrode and the second electrode, and at the bonding region of the second substrate on the surface of the first substrate, wiring extending from the first electrode to an external electrode is formed, and an additional wiring portion extending in a direction intersecting the wiring is provided on the wiring.

In this case, preferably the width of an additional wiring portion is equal to or less than 50% the width of the wiring and the length of the ridge is equal to or greater than the width of the wiring.

Here, the first substrate is, for example, a glass substrate, and the second substrate is, for example, as silicon substrate having a diaphragm and a thick part. The first electrode and second electrode are electrodes that form capacitance by being disposed such that each substrate faces each other, and the wiring, called the feedthrough in conventional technology, electrically connects the first electrode and the external electrode.

In addition, in another pressure sensor of the present invention, wiring is formed extending from the first electrode to an external terminal on the bonding region of the second substrate to the upper surface of the first substrate, and a frame crossing the wiring surrounding the circumference of this first electrode is provided on the wiring.

In this case, it is preferable that the wire width of this frame be equal to or greater than 2 μm.

In the pressure sensor of the present invention, by forming an additional wiring portion or a frame that crosses the wiring, on the straight part of the wiring not forming the additional wiring portion and the frame, a leakage path such as that shown by reference numeral 15 in FIG. 9 is formed, but this leakage path is blocked by the insulating layer at the part forming the additional wiring portion or frame, and the gas molecules that penetrate through this path are blocked from the reference pressure cavity. Therefore, in the sensor with a structure having an additional wiring portion or a frame, the rate that gas diffuses to the reference pressure cavity from outside the sensor is extremely slow. That is, the sensor of the present invention can make the leakage rate to the reference cavity sufficiently low in comparison with the sensor having a conventional structure, and because the pressure fluctuation in the reference pressure cavity when a constant external pressure is applied is small, it is possible to realize a pressure sensor having a small leakage defect rate.

In addition, the preferred range of the dimensions (length, width) of the additional wiring portion and the frame are described below in the preferred embodiments.

According to the pressure sensor of the present invention, by an additional wiring portion or frame being formed crossing the wiring, the leakage path along the edge of the wiring is blocked by the insulating layer at the part formed by the additional wiring portion and frame, and the gas molecules that penetrate through this path are blocked from the reference pressure cavity. Therefore, in the sensor of the present invention, in comparison with the conventional sensor, it is possible to sufficiently reduce the leakage rate to the reference pressure cavity, and the pressure fluctuation within the reference pressure cavity when a constant external pressure is applied becomes small. Thereby, it is possible to realize a pressure sensor whose leakage defect rate is small.

PREFERRED EMBODIMENTS

First Embodiment

Below, the first embodiment of the present invention will be explained referring to FIG. 1 and FIG. 2.

Figure 1:
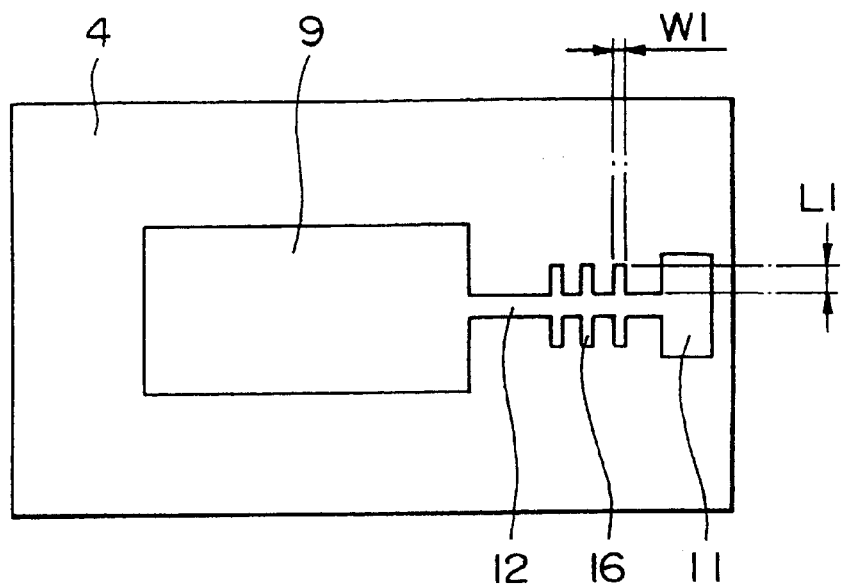
FIG. 1 is a planar drawing showing the electrode structure of the glass substrate of the pressure sensor according to the first embodiment of the present invention.
Figure 2:
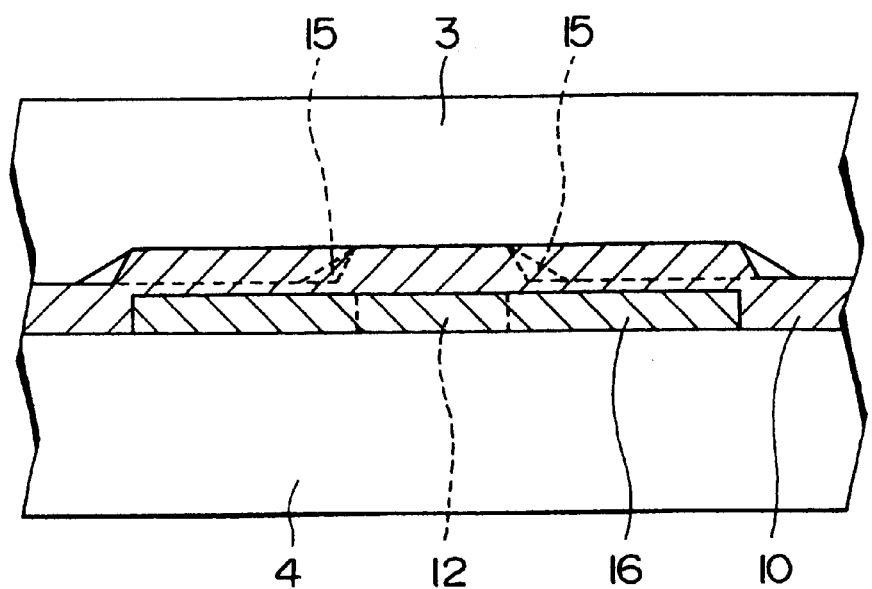
FIG. 2 is a cross-section seen on the plane along the line that passes through the spine shaped layer of the pressure sensor.

FIG. 1 is a planar drawing showing the structure of the electrode on the glass substrate side in the present embodiment of the pressure sensor, and FIG. 2 is a drawing showing the cross-sectional structure of the same pressure sensor.

Figure 6:
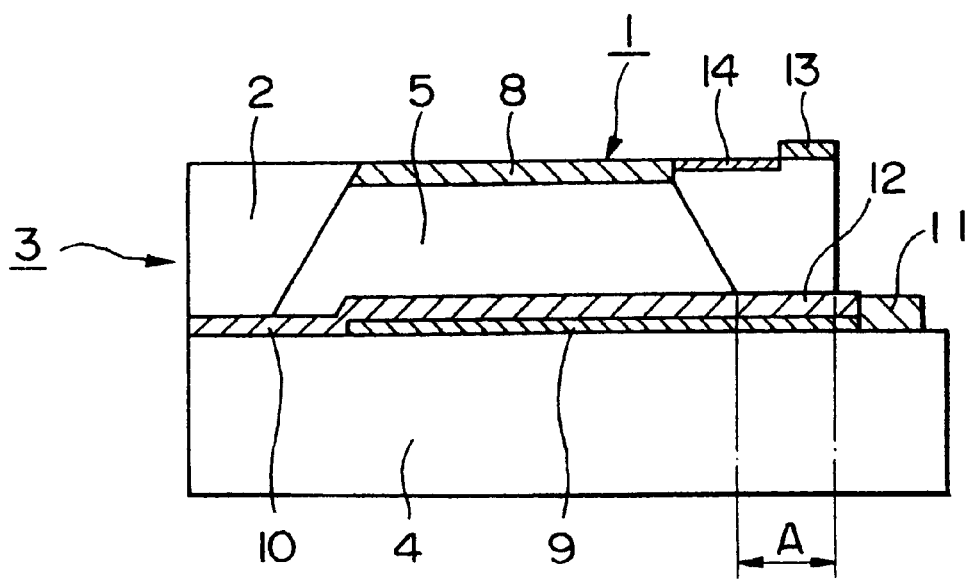
FIG. 6 is a vertical cross-section showing the structure of the electrode extending to the outside of the capacitance pressure sensor.
Figure 7:
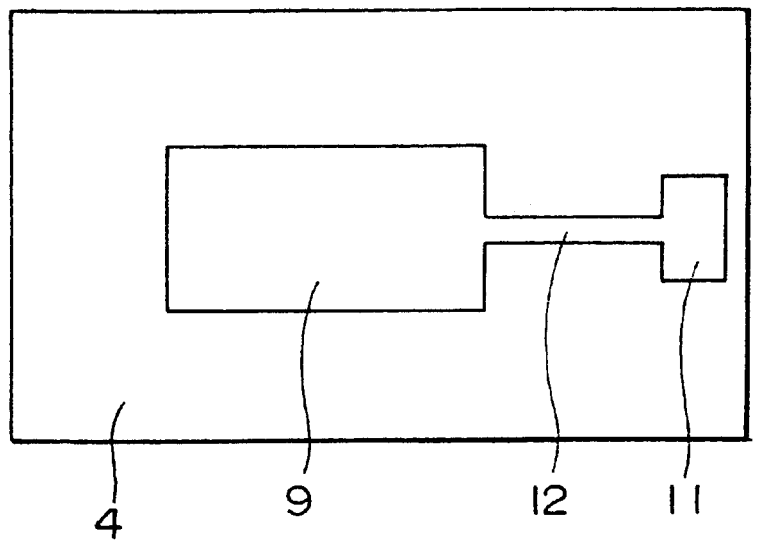
FIG. 7 is a planar drawing showing the electrode structure of the glass substrate of the pressure sensor.
Figure 8:
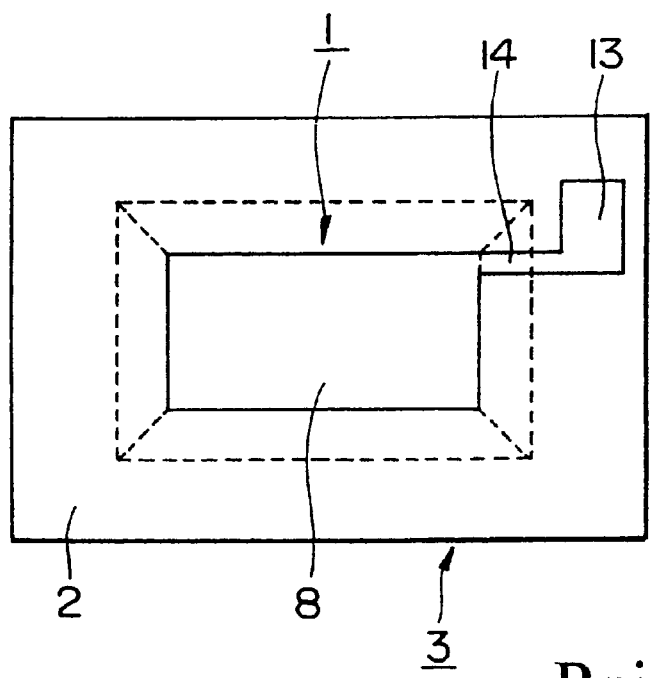
FIG. 8 is a planar drawing showing the electrode structure on the silicon substrate.

Moreover, the characteristic part of the pressure sensor of the present invention is the structure of the electrode on the glass substrate side, and the structure of the substrate having the diaphragm is the same as the conventional sensor shown in FIG. 6 and FIG. 8, and thus the explanation and figures for this part are omitted.

Figure 4:
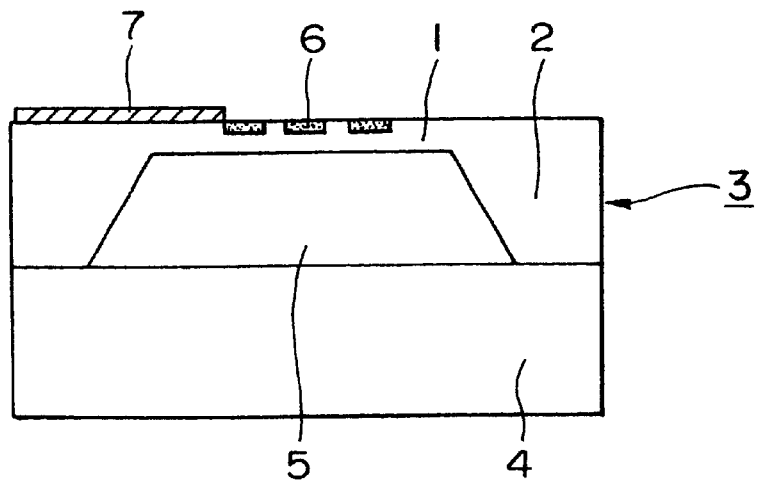
FIG. 4 is a cross-section of the conventional piezoresistant pressure sensor.
Figure 5:
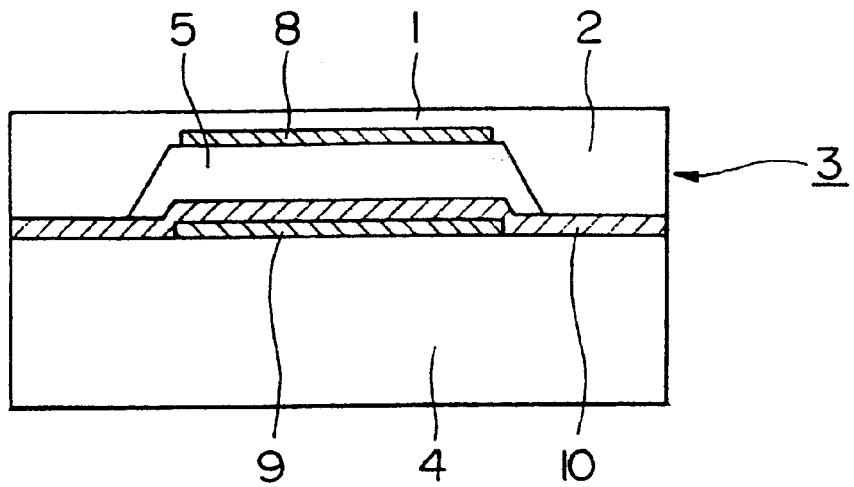
FIG. 5 is a vertical cross-section showing the basic structure of a capacitance pressure sensor.

As shown in FIG. 1, an electrode 9 (the first electrode) comprising a thin metallic layer is formed on the region positioned within the reference pressure cavity 5 as shown in FIG. 4 on the upper surface of the glass substrate 4 (the first substrate), and an external electrode 11 is formed on the region exposed outside the sensor on the edge of the substrate 4. In addition, in the region bonding the silicon wall 2 (thick part) of the silicon substrate 3 (second substrate), the feedthrough 12 (wiring) extending from the electrode 9 to the external electrode 11, and three spine shaped layers 16 (convex parts), extending in a direction perpendicular to the feedthrough 12, are formed. This spine shaped layers 16 are simultaneously formed integrally with the feedthrough 12, and its material and thickness are identical to those of the feedthrough 12. That is, when patterning the electrode formation after the formation of the thin metallic layer, the electrode 9, the external electrode 11, the feedthrough 12, and the spine shaped layers 16 are formed using the same integral pattern. Moreover, in FIG. 1, the spine shaped layers 16 extending from both sides of the feedthrough 12 have a symmetrical shape, but it is not necessary that it be symmetrical. In addition, it is not necessary that the spine shaped layers 16 be perpendicular to the feedthrough 12, and they can intersect at an angle other than 90°.

FIG. 2 is a drawing showing a cross-sectional structure along the line passing through the spine shaped layers 16, but as shown in this figure, on the spine shaped layers 16 an insulating layer 10 is formed. Furthermore, an insulating layer 10 is formed on the thin metallic layer that forms the electrode 9 and the feedthrough 12 as well, but due to the requirements of connecting with the external wiring, an insulating layer 10 is not formed on the external electrode 11.

In the pressure sensor of the present embodiment, because spine shaped layers 16 perpendicular to the feedthrough 12 having the same thinness as the feedthrough 12 are formed, in the straight part of the feedthrough 12 where the spine shaped layers 16 are not formed, even if a leakage path 15 is formed as shown by the broken line in FIG. 2, this leakage path 15 is blocked by the insulating layer 10 by the part that is formed by the spine shaped layers 16, and gas molecules penetrating through this path are blocked here. In addition, because the feedthrough 12 has a concavo-convex form, there is also the effect that the leakage path is difficult to form during electrostatic bonding to the silicon substrate 3. Therefore, in this sensor, the rate of gas penetration into the reference pressure cavity from outside the sensor is extremely slow, and in comparison with the conventional structure of a sensor, it is possible to sufficiently reduce the leakage rate.

Second Embodiment

Below, the second embodiment of the present invention is explained referring to FIG. 3.

Figure 3:
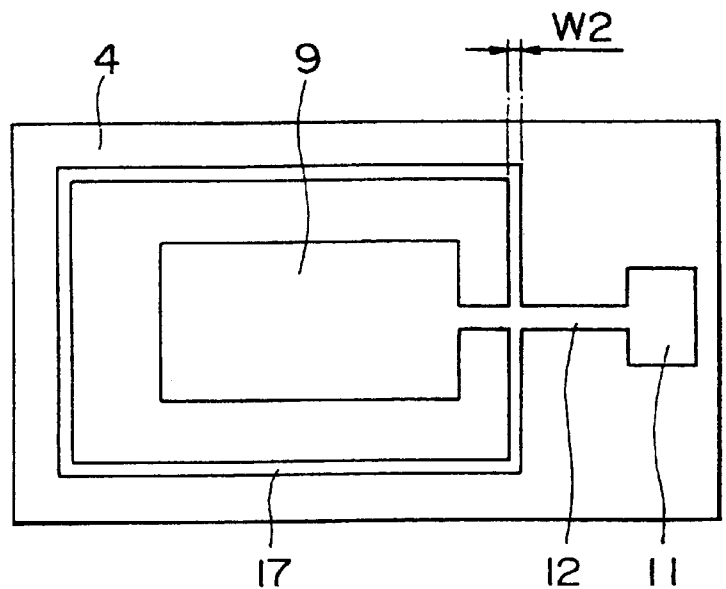
FIG. 3 is a planar figure showing the electrode structure of the glass substrate of the pressure sensor according to the second embodiment of the present invention.

FIG. 3 is a planar drawing showing the structure of the electrode on the glass substrate side in the pressure sensor of the present embodiment.

As shown in FIG. 3, an electrode 9 comprising a thin metallic layer is formed in the region positioned within the reference pressure cavity 5 as shown in FIG. 4 on the upper surface of the glass substrate 4, and an external electrode 11 is formed on the region exposed outside the sensor on the edge of the substrate 4. In addition, in the region bonding with the silicon substrate 3, the feedthrough 12 extending from the electrode 9 to the external electrode 11 is formed, and a peripheral layer 17 (frame part) is formed so as to surround the periphery of the electrode 9 perpendicular to the feedthrough 12. This peripheral layer 17 is simultaneously formed integrally with the feedthrough 12, and its material and thickness are identical to those of the feedthrough 12.

In the pressure sensor of the present embodiment, because the peripheral layer 17 is formed crossing the feedthrough 12, gas molecules penetrating through the leakage path 15 of the straight part of the feedthrough 12 are blocked at the peripheral layer 17. Thereby, in comparison to the conventional sensor, it is possible to achieve the same effect as the first embodiment, that is, the leakage rate can be sufficiently reduced.

EXPERIMENTAL EXAMPLES 1

Below, the first experimental example of the present invention will be explained.

For these examples, the dimensions of the spine shaped layer (length, width) in the sensor based on the above-described first embodiment wherein a spine shaped layer is formed are examined.

Samples for Example 1

A 3-inch silicon wafer and a 3-inch borosilicate glass substrate were used, and after bonding them to each other, 150 of 3 mm×4 mm sensor chips were manufactured from one substrate. The manufacturing process is as follows:

(1) First, a patterning is carried out on a silicon wafer so as to allow formation of a 1.2 mm diaphragm. Then using a KOH solution, the silicon wafer is etched, and this diaphragm is formed.

(2) At the same time, a chromium thin layer is formed on the glass substrate, and the electrode 9, the external electrode 11, the feedthrough 12, and the spine shaped layers 16 shown in FIG. 1 are formed so that their thickness is 0.1±0.01 $\mu$m. Moreover, in place of this chromium, it is possible to use other materials that exhibit metallic conductivity and have a superior adhesiveness to glass. One example would be titanium. In addition, a material having a compound structure, such as Ti/Pt/Ti or Cr/Au/Cr can also be used.

(3) On the glass substrate in the state described in (2) above, a borosilicate glass layer (insulating layer) having a thickness of 0.35±0.05 $\mu$m was formed on the surface that forms the patterning of the chromium layer.

(4) Next, the above-mentioned silicon wafer and the glass substrate were electrostatically bonded in a furnace maintaining a temperature of 400° C. By dicing this bonded substrate, 150 of 3 mm×4 mm sensor ships were manufactured.

Here, for the above sensor chip, the chromium layer is formed so as to satisfy the following conditions:

(a) The width of the feedthrough shown by reference numeral 12 in FIG. 1 is 50 $\mu$m.

(b) The length of the part (reference symbol A in FIG. 6) having a silicon/glass layer/feedthrough/glass substrate structure is 800 $\mu$m.

(c) The spine shaped layer (chromium layer) shown by reference numeral 16 in FIG. 1 in the center of the structure of (b) above is formed.

(d) Three spine shaped layers are symmetrically formed, and each is perpendicular to the feedthrough.

(e) The gap between the three spine shaped layers in (d) above is 100 $\mu$m.

(f) The length of the spine shaped layer (reference symbol L1 in FIG. 1) is 50 $\mu$m (identical to the width of the feedthrough), and its width is 25 $\mu$m (50% of the width of the feedthrough).

Sample for Example 2

One spine shaped layer having a length of 100 $\mu$m (double the width of the feedthrough) and a width of 10 $\mu$m (20% the width of the feedthrough) of was made at the center, and otherwise conditions were identical to those of examples 1.

Sample for Example 3

The width of the feedthrough was made 100 $\mu$m, and otherwise conditions were identical to those of examples 2. (The length of the spine shaped layer is identical to the width of the feedthrough, and the width of the spine shaped layer is 10% the width of the feedthrough).

Sample for Example 4

The angle of the spine shaped layer is 60° with respect to the feedthrough, and otherwise conditions were identical to those of examples 2.

Sample for the Conventional Examples 1

A spine shaped layer was not formed, and otherwise conditions were identical to those of examples 1. That is, the conventional example 1 is a sensor chip having a conventional structure.

Sample for Comparative Examples 1

The length of the spine shaped layers was 25 μm (50% the length of the feedthrough), the width was 50 μm (identical to the width of the feedthrough), and otherwise the conditions were identical to those of examples 2.

A RADIFLO LEAK TEST was applied to 150 each of the sensor chips manufactured in the above examples 1 to 4, conventional examples 1, and comparative examples 1, and the leakage rate was measured. The results are shown in Table 1. Moreover, in this RADIFLO LEAK TEST, Kr85 was used as an isotope, and after maintaining the sensor chip at 5 atmospheres in nitrogen gas and Kr85 for 15 hours, the β radiation from each sensor chip was detected, and its rate measured.

TABLE 1

| Leakage rate: α (atm · cc/sec) | example 1 | example 2 | example 3 | example 4 |
|---|---|---|---|---|
| $\alpha \leq 1 \times 10^{-13}$ | 149 | 143 | 141 | 148 |
| $1 \times 10^{-13} < \alpha \leq 1 \times 10^{-12}$ | 1 | 2 | 9 | 0 |
| $1 \times 10^{-12} < \alpha$ | 0 | 0 | 0 | 0 |
| total | 150 | 145 | 150 | 148 |

| Leakage rate: α (atm · cc/sec) | conventional examples 1 | comparative example 1 |
|---|---|---|
| $\alpha \leq 1 \times 10^{-13}$ | 64 | 56 |
| $1 \times 10^{-13} < \alpha \leq 1 \times 10^{-12}$ | 27 | 79 |
| $1 \times 10^{-12} < \alpha$ | 59 | 11 |
| total | 150 | 146 |

As is clear from Table 1, among the 150 samples in examples 1 to 4, in more than 90% of the samples it was possible to confirm a leakage rate equal to or less than $1 \times 10^{-13}$ atm·cc/sec, and none exceeded $1 \times 10^{-12}$ atm·cc/sec. In contrast, in the conventional examples 1, 40% of the examples had a leakage rate exceeding $1 \times 10^{-12}$ atm·cc/sec. In addition, compared to the examples 1 to 4, even among comparative examples 1 having a short spine shaped layer and a wide width, only 40% of the samples as a whole could be confirmed to have a leakage rate equal to or less than $1 \times 10^{-13}$ atm·cc/sec, and 50% of the examples were between $1 \times 10^{-12}$ to $1 \times 10^{-13}$ atm·cc/sec. From these results, in order to keep the leakage rate equal to or less than $1 \times 10^{-13}$ atm·cc/sec, it is preferable that the width of the spine shaped layers be equal to or less than 50% of the feedthrough, and the length be equal to or greater than the width of the feedthrough.

EXPERIMENTAL EXAMPLES 2

Below, the experimental examples 2 of the present invention will be explained.

For these examples, the dimensions (pattern width) of the peripheral membrane in a sensor having an external membrane formed on the glass substrate based on the above-described second embodiment are examined.

Sample for Examples 5

A 3-inch silicon wafer and a 3-inch borosilicate glass substrate were used, and after bonding them to each other, 150 3 mm×4 mm sensor chips were manufactured from one substrate. The manufacturing process is as follows:

(1) First, a patterning is carried out on a silicon wafer so as to allow formation of a 1.2 mm diaphragm. Then using a KOH solution, the silicon wafer is etched, and this diaphragm is formed.

(2) At the same time, a thin chromium layer is formed on the glass substrate, and the electrode 9, the external electrode 11, the feedthrough 12, and the peripheral layer 17 shown in FIG. 3 are formed so that their thickness is 0.1±0.01 μm. Moreover, in place of this chromium, it is possible to use other materials that exhibit metallic conductivity and have a superior adhesiveness to glass. One example would be titanium. In addition, a material having a compound structure, such as Ti/Pt/Ti or Cr/Au/Cr can also be used.

(3) On the glass substrate in the state described in (2) above, a borosilicate glass layer (insulating layer) having a thickness of 0.35±0.05 μm was formed on the surface that forms the patterning of the chromium layer.

(4) Next, the above-mentioned silicon wafer and the glass substrate were electrostatically bonded in a furnace maintaining a temperature of 400° C. By dicing this bonded substrate, 150 of 3 mm×4 mm sensor ships were manufactured. This process is identical to examples 1.

Here, on the above-described sensor chip, a chromium layer is formed so as to satisfy the following conditions:

(a) The width of the feedthrough 12 in FIG. 3 is 50 μm.
(b) The length of the part having a silicon/glass layer/feedthrough/glass substrate structure is 800 μm.
(c) The width (reference symbol W2 in FIG. 3) of the peripheral layer 17 of FIG. 3 is 5 μm.
(d) This peripheral layer is patterned having a width of 5 μm, and centered separated by 100 μm from the bonding edge facing the reference pressure cavity opposite to the outside of the sensor.

Sample of Examples 6

The width of the peripheral layer is 2 μm, and otherwise the conditions are identical to those of the examples 5.

Sample of Conventional Examples 2

No peripheral layer is formed, and otherwise the conditions are identical to those of the embodiment example 5. That is, the conventional example is a sensor chip having a conventional structure.

Sample of Comparative Examples 2

The width of the peripheral layer is 1 μm, and otherwise the conditions are identical to those of the examples 5.

A RADIFLO LEAK TEST was applied to 150 each of the sensor chips manufactured in the above examples 5 and 6, conventional examples 2, and comparative examples 2, and the leakage rate was measured. The results are shown in Table 2. Moreover, in this RADIFLO LEAK TEST, Kr85 was used as an isotope, and after maintaining the sensor chip at 5 atmospheres in nitrogen gas and Kr85 for 15 hours, the β radiation from each sensor chip was detected, and its rate measured.

TABLE 2

| Leakage rate: α (atm · cc/sec) | example 5 | example 6 | conventional example 3 | comparative example 4 |
|---|---|---|---|---|
| $\alpha \leq 1 \times 10^{-13}$ | 150 | 150 | 64 | 131 |
| $1 \times 10^{-13} < \alpha \leq 1 \times 10^{-12}$ | 0 | 0 | 27 | 17 |
| $1 \times 10^{-12} < \alpha$ | 0 | 0 | 59 | 2 |
| total | 150 | 150 | 150 | 150 |

As is clear from Table 2, in embodiment examples 5 and 6, all 150 samples had a leakage rate equal to or less than $1\times10^{-13}$ atm·cc/sec. In contrast, in the conventional examples 2, about 40% of the examples had a leakage rate exceeding $1\times10^{-12}$ atm·cc/sec. In addition, compared to the embodiment examples 5 and 6, in the case of comparative examples 2 having a narrow peripheral layer, 90% of all samples were confirmed to have a leakage rate equal to or less than $1\times10^{-13}$ atm·cc/sec. From these results, in order to keep the leakage rate equal to or less than $1\times10^{-13}$ atm·cc/sec. reliably, it is understood that preferably the width of the peripheral layer is equal to or greater than 2 μm.

Moreover, when comparing the results of the above-described experimental examples 1 and the experimental examples 2, in the case of experimental examples 1 for the spine shaped layer, the width should be smaller than a given value, and in experimental examples 2 for the peripheral layer, the width should be larger than a given value. Initially, these two results appear to conflict.

However, it can be supposed this difference to be based on a difference in the mechanism related to the blocking of the leakage path in the case of the spine shaped layer and the peripheral layer.

Figure 9:
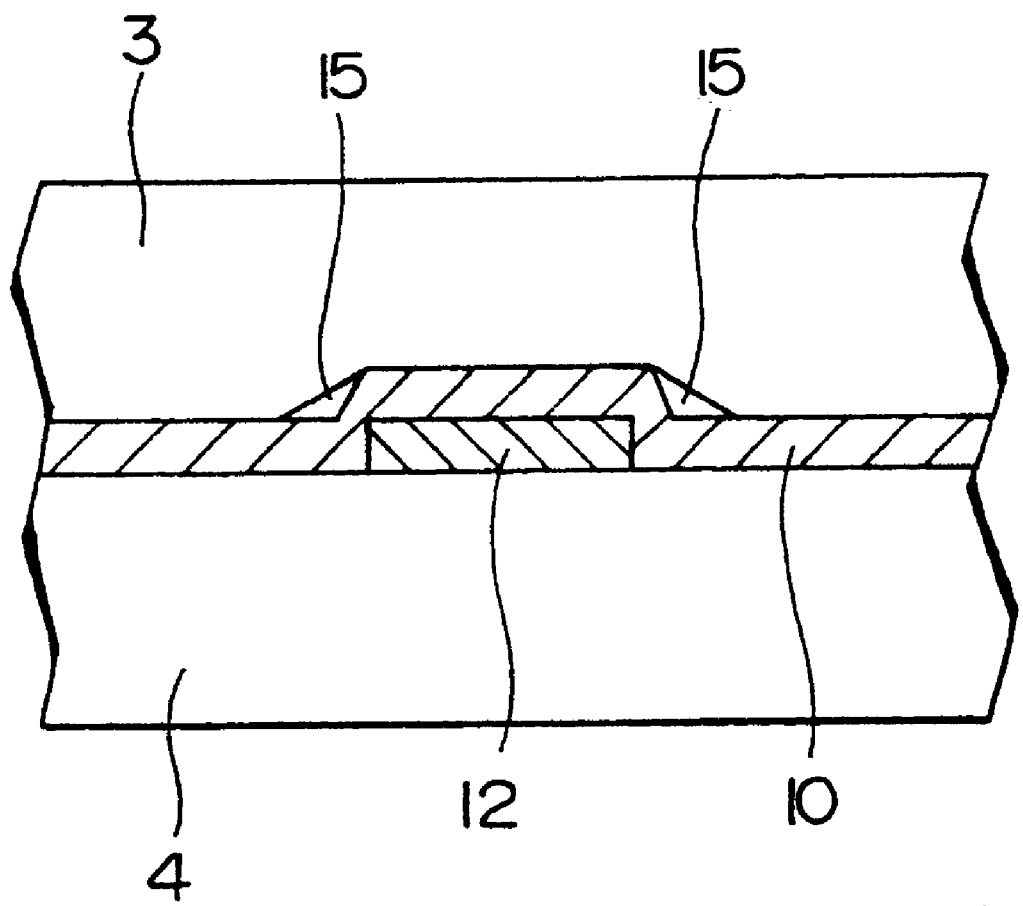
FIG. 9 is a drawing for explaining the problems in the conventional pressure sensor.

Generally, a feedthrough comprising a straight thin metallic layer is formed on the surface of a glass substrate, and after forming a glass layer (insulating layer) thereon, when this is electrostatically bonded to the silicon substrate, the glass layer on the part of the feedthrough having a difference in level weakens and deforms due to the heat during electrostatic bonding, and the gap 15 (leakage path) between the glass layer 10 and the silicon substrate 2 shown in FIG. 9 have a tendency to become small.

In the case of a structure that has a spine shaped layer added, it is thought that the blocking effect of the leakage path generally depends on the above-described activity, and it is conjectured that the degree of deformation of the glass layer is greater in the case that the spine shaped layer is narrow rather than wide, and the leakage path becomes smaller, thereby a good result is obtained when the width of the spine shaped layer is narrow.

In contrast, in the case of a structure that has a peripheral layer added, the gap between the glass layer and the silicon substrate formed on the outer edge of the peripheral layer and the gap made on the inner edge are closed off from each other, and there is no connection between therebetween. Therefore, the leakage path passing though both edges of the feedthrough from outside the sensor connects to the gap made on the outer edge of the peripheral layer, and is not connected to the gap made on the inner edge of the peripheral layer, that is, on the side of the reference pressure cavity. The blocking effect on the peak path in the case of the peripheral layer is thought to be generally dependent on this point. Therefore, in the case of this structure, the leakage path becomes structurally blocked, but in fact when the width of the peripheral layer is narrow, because leakage through pin holes existing in the layer itself occurs easily, the width of the peripheral width should have a certain degree of wideness.

Moreover, the technical scope of the present invention is not limited to the above-described embodiments, and several variations are possible that within the gist of the invention. For example, the materials and dimensions of each of the layers, or the shapes of the spine shaped layer and the peripheral layer formed on the feedthrough are not limited to the above-described embodiments or examples, and can be appropriately altered.

What is claimed is:

1. A semiconductor pressure sensor, comprising:
   a first substrate having a surface;
   a second substrate having a diaphragm and a thick part surrounding the diaphragm and forming a wall around said diaphragm, said diaphragm connected to said thick part and spanning over a region defined by said wall, wherein at least one surface of said wall bonds said second substrate to said first substrate;
   a first electrode disposed on the surface of the first substrate opposite the diaphragm;
   a second electrode on the diaphragm opposite the first electrode;
   an insulating layer covering the first electrode and said first substrate opposite the diaphragm, said insulating layer separating said first electrode and said second electrode;
   wiring on the surface of said first substrate in a region between the first and second substrates and extending between the first electrode and an external electrode; and
   a plurality of additional wiring portions intersecting the wiring, the additional wiring portions being connected to the outside of the wiring on the surface of the first substrate in a region between the first and second substrates, and projecting along the surface of the first substrate from the wiring in a direction which is not parallel to the direction of the wiring,
   wherein capacitance between the first and second electrodes changes in response to a deflection of the diaphragm resulting from pressure whereby pressure is detected.

2. A pressure sensor according to claim 1 wherein the width of said additional wiring portions is equal to or less than 50% of the width of said wiring, and the length of said additional wiring portions is equal to or greater than the width of said writing.

3. A pressure sensor according to claim 1 further comprising a plurality of additional wiring portions on one side of said wiring.

4. A pressure sensor according to claim 3 wherein the additional wiring portions extend on both sides of said wiring have a symmetrical shape.

5. A pressure sensor according to claim 4 wherein said additional wiring portions are perpendicular to said wiring.

6. A pressure sensor according to claim 5 wherein the width of said wiring is 50 μm.

7. A pressure sensor according to claim 6 wherein said insulating layer comprises a borosilicate glass layer, and the thickness of this layer is 0.35±0.005 μm.

8. A pressure sensor according to claim 7 wherein said wiring and said additional wiring portions comprise a material having a chromium, a titanium, or a Ti/Pt/Ti or Cr/Au/Cr compound structure.

9. A pressure sensor according to claim 8 wherein said first substrate is a glass substrate and said second substrate is a silicon substrate.

10. A pressure sensor according to claim 4 wherein said additional wiring portions intersect said wiring at an angle other than 90°.

11. A pressure sensor according to claim 3 wherein the additional wiring portions extend on both sides of said wiring and have an asymmetrical shape.

12. A pressure sensor according to claim 11 wherein said additional wiring portions are perpendicular to said wiring.

13. A pressure sensor according to claim 11 wherein said additional wiring portions intersect said wiring at an angle other than 90°.

14. A pressure sensor according to claim 1, wherein a reference pressure cavity is formed by a space defined by said second electrode on the diaphragm, said insulating layer covering the first electrode opposite said second electrode and said thick part surrounding the diaphragm;

wherein the additional wiring portions connected to the outside of the wiring on the surface of the first substrate in a region between the first and second substrates block leakage of gas along the edge of the wiring between the reference pressure cavity and the outside of the pressure sensor.

15. A semiconductor pressure sensor, comprising:

a first substrate having a surface;

a second substrate having a diaphragm and a thick part surrounding the diaphragm and forming a wall around said diaphragm, said diaphragm connected to said thick part and spanning over a region defined by said wall, wherein at least one surface of said wall bonds said second substrate to said first substrate;

a first electrode disposed on the surface of the first substrate opposite the diaphragm;

a second electrode on the diaphragm opposite the first electrode;

an insulating layer covering the first electrode and the first substrate opposite the diaphragm, said insulating layer separating said first electrode and said second electrode;

wiring on the surface of the first substrate in a region between the first and second substrates and extending between the first electrode and an external electrode; and a frame surrounding a periphery of the first electrode and intersecting the wiring, wherein capacitance between the first and second electrodes changes in response to a deflection of the diaphragm resulting from pressure whereby pressure is detected.

16. A pressure sensor according to claim 15 wherein the wire width of said frame is at least 2 $\mu$m.

17. A pressure sensor according to claim 16 wherein the wire width of said frame is 5 $\mu$m.

18. A pressure sensor according to claim 17 wherein said insulating layer comprises a borosilicate glass layer, and the thickness of this layer is 0.35±0.05 $\mu$m.

19. A pressure sensor according to claim 18 wherein said wiring and said frame comprise a material having a chromium, a titanium, or a Ti/Pt/Ti or Cr/Au/Cr compound structure.

20. A pressure sensor according to claim 19 wherein said first substrate is a glass substrate and said second substrate is a silicon substrate.

21. A semiconductor pressure sensor, comprising:

a first substrate having a surface;

a second substrate having a diaphragm and a thick part surrounding the diaphragm and forming a wall around said diaphragm, said diaphragm connected to said thick part and spanning over a region defined by said wall, wherein at least one surface of said wall bonds said second substrate to said first substrate;

a first electrode disposed on the surface of the first substrate opposite the diaphragm;

a second electrode on the diaphragm opposite the first electrode;

an insulating layer covering the first electrode and opposite the diaphragm, said insulating layer separating said first electrode and said second electrode; and wiring on the surface of the first substrate in a region between the first and second substrates and extending straight between the first electrode and an external electrode;

wherein a border line of the wiring on the surface of the first substrate has a length that is greater than a length of the straight extending wiring, to block the leakage path along the edge of the wiring and wherein capacitance between the first and second electrodes changes in response to a deflection of the diaphragm resulting from pressure, whereby pressure is detected.

22. A pressure sensor according to claim 21, wherein a reference pressure cavity is formed by a space defined by said second electrode on the diaphragm, said insulating layer covering the first electrode opposite the diaphragm and said thick part surrounding the diaphragm;

wherein the additional wiring portion connected to the outside of the wiring on the surface of the first substrate in a region between the first and second substrates blocks leakage of gas along the edge of the wiring between the reference pressure cavity and the outside of the pressure sensor.

23. A semiconductor pressure sensor, comprising:

a first substrate having a surface;

a second substrate having a diaphragm and a thick part surrounding the diaphragm and forming a wall around said diaphragm, said diaphragm connected to said thick part and spanning over a region defined by said wall, wherein at least one surface of said wall bonds said second substrate to said first substrate;

a first electrode disposed on the surface of the first substrate opposite the diaphragm;

a second electrode on the diaphragm opposite the first electrode;

an insulating layer covering the first electrode and opposite the diaphragm, said insulating layer separating said first electrode and said second electrode;

wiring on the surface of the first substrate in a region between the first and second substrates and extending between the first electrode and an external electrode; and an additional wiring portion connected to the outside of the wiring on the surface of the first substrate in a region between the first and second substrates, and projecting along the surface of the first substrate from the wiring in a direction which is not parallel to the direction of the wiring;

wherein capacitance between the first and second electrodes changes in response to a deflection of the diaphragm resulting from pressure whereby pressure is directed.

24. A semiconductor pressure sensor, comprising:

a first substrate having a surface;

a second substrate having a diaphragm and a thick part surrounding the diaphragm and forming a wall around said diaphragm, said diaphragm connected to said thick part and spanning over a region defined by said wall, wherein said second substrate bonds to said first substrate via at least one surface of said wall;

a first electrode disposed on the surface of the first substrate opposite the diaphragm;

a second electrode incorporated in said diaphragm, said second electrode residing opposite the first electrode;

an insulating layer covering the first electrode and the first substrate opposite the diaphragm, said insulating layer separating said first electrode and said second electrode;

wiring on the surface of the first substrate in a region between the first and second substrates and extending between the first electrode and an external electrode; and a plurality of additional wiring portions intersecting the wiring, the additional wiring portions being connected to the outside of the wiring on the surface of the first substrate in a region between the first and second substrates, and projecting along the surface of the first substrate from the wiring in a direction which is not parallel to the direction of the wiring, to block a leakage path along the edge of said wiring;

wherein capacitance between the first and second electrodes changes in response to a deflection of the diaphragm resulting from pressure whereby pressure is directed.

25. A semiconductor pressure sensor, comprising:

a first substrate having a surface;

a second substrate having a diaphragm and a thick part surrounding said diaphragm and forming a wall around said diaphragm, said diaphragm connected to said thick part and spanning over a region defined by said wall, wherein said second substrate bonds to said first substrate via at least one surface of said wall;

a first electrode disposed on said surface of said first substrate opposite said diaphragm;

a second electrode incorporated in said diaphragm, said second electrode residing opposite said first electrode;

an insulating layer covering said first electrode and said first substrate opposite said diaphragm, said insulating layer separating said first electrode and said second electrode;

wiring on said surface of said first substrate in a region between said first and second substrates and extending between said first electrode and an external electrode; and a frame surrounding a periphery of said first electrode and intersecting said wiring, wherein capacitance between said first and second electrodes changes in response to a deflection of said diaphragm resulting from pressure whereby pressure is directed.

* * * * *

UNITED STATES PATENT AND TRADEMARK OFFICE
CERTIFICATE OF CORRECTION

PATENT NO. : 6,363,791 B1　　　　　　　　　　　　　　　　　　Page 1 of 1
DATED : April 2, 2002
INVENTOR(S) : Kurosaka et al.

It is certified that error appears in the above-identified patent and that said Letters Patent is hereby corrected as shown below:

<u>Title page,</u>
Item [73], Assignee, please correct Assignee name from: "Fujitsu Ltd." to
-- Fujikura Ltd. --

Signed and Sealed this

Twenty-seventh Day of August, 2002

*Attest:*

*Attesting Officer*

JAMES E. ROGAN
*Director of the United States Patent and Trademark Office*